Patented Oct. 12, 1943

2,331,803

UNITED STATES PATENT OFFICE 2,331,803

METHOD OF PRODUCING ROSIN ESTERS

Raymond F. Schlaanstine, Kennett Square, Pa., assignor to Hercules Powder Company, Wilmington, Del., a corporation of Delaware No Drawing. Application May 2, 1941, Serial No. 391,483

8 Claims. (Cl. 260—104)

This invention relates to an improved method of producing rosin esters and more particularly relates to an improved method for producing glycol esters of a rosin.

The esterification of rosin with ethylene glycol by heating the rosin and ethylene glycol under reflux conditions at temperatures of about 200° C. has been described. By such a process a very extended heating is required to produce esters of relatively low acidity. Use of catalysts such as zinc dust and boric acid have been suggested to accelerate the esterification rate. Even with use of a catalyst the esterification is so slow as to require abnormally long heating periods. Furthermore, use of a catalyst in the esterification is not very practical since it is necessary to remove the catalyst from the final ester and also since the catalysts generally have a deleterious effect on the rosin or rosin ester such as effecting its water-sensitivity, its melting point, etc. Removal of the catalyst from the finished ester is also attended with difficulties and complete removal is not easily obtained. Similar difficulties are encountered in the esterification of rosin with other low-boiling glycols.

It is an object of this invention to provide an improved method of heating rosin with aliphatic glycols having no more than 3 carbon atoms to provide esters of low acidity. It is another object to provide a method of esterifying a rosin with ethylene glycol which will provide an ester of low acidity without use of an appreciable excess of the glycol and with use of a relatively short heating period. Other objects of the invention will appear hereinafter.

The above objects are accomplished in accordance with this invention by heating a rosin with not over about one-half the equivalent proportion of an aliphatic glycol having no more than 3 carbon atoms to a temperature in the range of about 250° C. to about 290° C. and thereafter continuing the heating at atmospheric pressure at the above temperatures and adding further amounts of the glycol gradually at such a rate which will permit rapid combination with the rosin without appreciable volatilization until the equivalent amount or slight excess thereover has been added. The heating is then continued until an ester of low acidity is produced. By carrying out the esterification in the above manner the heating is carried out at a temperature at which rosin is more reactive with the glycol and thereby a considerable reduction in reaction time is made possible. By adding the glycol gradually during the heating it undergoes partial combination with the rosin quite rapidly and thereby does not volatilize from the reaction vessel. At the completion of the heating period any unreacted glycol or other volatile matter may be removed by distillation, preferably under reduced pressure.

By carrying out the esterification of a rosin with an aliphatic glycol having no more than 3 carbon atoms in the above manner, it is possible to prepare the glycol ester without use of a catalyst or superatmospheric pressure so as to obtain an ester of low acidity without contamination by catalyst materials or the defects in the ester which use of catalyst introduces. It is also possible to produce an ester of a rosin and an aliphatic glycol having no more than 3 carbon atoms with low acidity in a shorter heating period than has been possible heretofore.

The rosin which may be used in the process may be any of the various grades of wood rosin or gum rosin or the resin acids contained therein, as for example, abietic acid, pimaric acid, sapinic acid, etc. Modified forms of rosins may also be employed such as for example, hydrogenated rosin, polymerized rosin, heat-treated rosin, rearranged rosin such as Hyex rosin, etc. All such materials are classified as rosins for the purposes of describing the invention. The glycols to which this invention is applicable comprise the low-boiling aliphatic glycols of 2 and 3 carbon atoms, such a class of glycols being represented by ethylene glycol, propylene glycol and trimethylene glycol. The highest boiling point of these glycols is 214° C. The invention is particularly applicable to the preparation of the ethylene glycol ester, since the low boiling point of ethylene glycol (197° C.) renders preparation of its rosin esters by normal methods a very difficult operation.

In carrying out the esterification in accordance with the method of this invention the rosin is heated with a small amount of the low-boiling glycol, usually about ¼ of the equivalent amount, and not over about ½ of the equivalent amount, to a temperature within the range of 250° C. to 290° C. After a short heating at this temperature further amounts of the glycol are added gradually in a continuous stream or in aliquot proportions at such a rate that the amount of refluxing of the glycol will be held to a minimum. A reflux condenser will be preferably employed to return any condensed glycol to the reaction vessel. The rate at which the additional glycol may be added will depend to a certain extent on the actual temperature of esterification employed. Alternatively, the rosin may be heated to within the temperature of 250 to 290° C. and approximately the equivalent amount of the low-boiling glycol added gradually to the heated rosin at a rate which will permit rapid combination without appreciable volatilization.

After the addition of the glycol is complete the heating may be continued to provide an ester of the desired low acidity. Usually an ester having an acid number of below 20 is desired. However, esters of the above glycols and particularly ethylene glycol and rosin having an acid number below 10 are easily obtainable according to the described method without use of more than a slight excess of the glycol.

The following examples are illustrative of the various embodiments of the invention.

Example I

Twenty-four hundred and seven parts by weight of N wood rosin and 67.5 parts by weight of ethylene glycol were heated together to a temperature of 255° C. in about 2.5 hours. At this point an additional 67.5 parts by weight of ethylene glycol were added and the temperature maintained at 255 to 260° C. After an additional 2 hours of heating the third addition of 67.5 parts by weight of ethylene glycol was introduced and the heating continued at the same temperature. After 2 more hours' heating the last addition of 60 parts by weight of ethylene glycol was made and the heating continued at a temperature of 260 to 270° C. Five hours after the last addition of ethylene glycol the acid number of the ester was 26. By continuing the heating for 8 hours after the addition of the last ethylene glycol the acid number had dropped to 10. At this point the pressure was reduced to about 15 mm. and the volatile materials removed by distillation. The ethylene glycol ester obtained had an acid number of 10, a melting point (drop) of 61° C. and a Lovibond color of 21 Amber.

Example II

Two thousand parts by weight of distilled hydrogenated rosin having a saturation corresponding to about 70% of both double bonds of the rosin and 50 parts by weight of ethylene glycol were heated together to a temperature of about 270° C. in 1½ hours and the heating continued at this temperature for 2 hours. An additional 50 parts by weight of ethylene glycol were then added and the heating continued at the same temperature. After 6½ hours' heating at 270° C. the third addition of 50 parts by weight of ethylene glycol was made. Again after 9 hours' heating at 270° C. the fourth addition of 50 parts by weight of ethylene glycol was made. The heating was then continued at a temperature within the range of 270 to 285° C. for 6 hours after the last addition of ethylene glycol, and unreacted glycol and other volatile matter then removed by distillation under reduced pressure. The ethylene glycol ester of hydrogenated rosin which resulted had an acid number of 17, a melting point (drop) of 51.5° C. and a Lovibond color of 26 Amber. Thus a total heating period of approximately 17 hours was involved.

Example III

Five hundred parts by weight of N wood rosin and 17.5 parts by weight of propylene glycol were heated together to a temperature of about 280° C. in 1½ hours and the heating continued at 280–288° C. After 30 minutes heating at the latter temperature a second portion of 17.5 parts of propylene glycol was added and heating continued. A third portion of 17.5 parts of propylene glycol was added after 1½ hours heating at 280–288° and a fourth portion of 17.5 parts of propylene glycol after 2½ hours heating at the same temperature. An additional 10 parts of propylene glycol were added after 10 hours heating at the same temperature. After 13½ hours heating the ester was sparged with a rapid stream of carbon dioxide for ½ hour to remove any unreacted glycol, and the ester cooled. The total heating time at 280 to 288° C. was thus approximately 14 hours. The propylene glycol ester obtained had an acid number of 21, a melting point (drop) of 74° C. and a Lovibond color of 38 Amber.

It will be apparent from the above description and examples that the improved process of producing glycol esters of rosin provides a much more satisfactory method than has been known heretofore for producing such esters of low acidity. It makes it possible to obtain an ester of low acidity from a low-boiling aliphatic glycol in a shorter reaction time and without use of catalysts or superatmospheric pressure.

It will be understood that the details and examples hereinbefore set forth are illustrative only and that the invention as broadly described and claimed is in no way limited thereby.

What I claim and desire to protect by Letters Patent is:

1. The method of producing an ester of a rosin and an aliphatic glycol having no more than 3 carbon atoms which comprises heating a rosin with not over about one-half the equivalent amount of the said glycol to a temperature in the range of about 250° C. to about 290° C., continuing the heating at atmospheric pressure at the aforesaid temperature and adding further amounts of the glycol gradually at such a rate as will permit rapid combination without appreciable volatilization, and continuing the heating until an ester of low acidity is produced.

2. The method of producing an ester of a rosin and an aliphatic glycol having no more than 3 carbon atoms which comprises heating a rosin with not over about one-half the equivalent amount of the said glycol to a temperature in the range of about 250° C. to about 290° C., continuing the heating at atmospheric pressure at the aforesaid temperature and adding further amounts of the glycol gradually at such a rate as will permit rapid combination without appreciable volatilization and until no more than a slight excess over the equivalent combining proportion has been introduced, and continuing the heating until an ester of low acidity is produced.

3. The method of producing an ester of a wood rosin and an aliphatic glycol having no more than 3 carbon atoms which comprises heating a wood rosin with not over about one-half the equivalent amount of the said glycol to a temperature in the range of about 250° C. to about 290° C., continuing the heating at atmospheric pressure at the aforesaid temperature and adding further amounts of the glycol gradually at such a rate as will permit rapid combination without appreciable volatilization and until no more than a slight excess over the equivalent combining proportion has been introduced, and continuing the heating until an ester of low acidity is produced.

4. The method of producing an ester of a gum rosin and an aliphatic glycol having no more than 3 carbon atoms which comprises heating a gum rosin with not over about one-half the equivalent amount of the said glycol to a temperature in the range of about 250° C. to about 290° C., continuing the heating at atmospheric pressure at the aforesaid temperature and adding further amounts of the glycol gradually at such a rate as will permit rapid combination without appreciable volatilization and until no more than a slight excess over the equivalent combining proportion has been introduced, and continuing the heating until an ester of low acidity is produced.

5. The method of producing an ester of a hydrogenated rosin and an aliphatic glycol having no more than 3 carbon atoms which comprises heating a hydrogenated rosin with not over about one-half the equivalent amount of the said glycol to a temperature in the range of about 250° C. to about 290° C., continuing the heating at atmospheric pressure at the aforesaid temperature and adding further amounts of the glycol gradually at such a rate as will permit rapid combination without appreciable volatilization and until no more than a slight excess over the theoretical combining proportion has been introduced, and continuing the heating until an ester of low acidity is produced.

6. The method of producing the ethylene glycol ester of a wood rosin which comprises heating a wood rosin with not over about one-half the equivalent amount of ethylene glycol to a temperature in the range of about 250° C. to about 290° C., continuing the heating at atmospheric pressure at the aforesaid temperature and adding further amounts of ethylene glycol gradually at such a rate as will permit rapid combination without appreciable volatilization and until no more than a slight excess over the equivalent combining proportion has been introduced, and continuing the heating until an ester of low acidity is produced.

7. The method of producing the ethylene glycol ester of a gum rosin which comprises heating a gum rosin with not over about one-half the equivalent amount of ethylene glycol to a temperature in the range of about 250° C. to about 290° C., continuing the heating at atmospheric pressure at the aforesaid temperature and adding further amounts of ethylene glycol gradually at such a rate as will permit rapid combination without appreciable volatilization and until no more than a slight excess over the equivalent combining proportion has been introduced, and continuing the heating until an ester of low acidity is produced.

8. The method of producing the ethylene glycol ester of a hydrogenated rosin which comprises heating a hydrogenated rosin with not over about one-half the equivalent amount of ethylene glycol to a temperature in the range of about 250° C. to about 290° C., continuing the heating at atmospheric pressure at the aforesaid temperature and adding further amounts of ethylene glycol gradually at such a rate as will permit rapid combination without appreciable volatilization and until no more than a slight excess over the equivalent combining proportion has been introduced, and continuing the heating until an ester of low acidity is produced.

RAYMOND F. SCHLAANSTINE.